INVENTOR
KARL RÖDER

United States Patent Office 3,507,167
Patented Apr. 21, 1970

3,507,167
BEARING SUPPORT FOR A LINKAGE LEVER AT THE DRIVE PEDAL OF MOTOR VEHICLES
Karl Röder, Stuttgart-Monchfeld, Germany, assignor to Daimler-Benz Aktiengesellschaft, Stuttgart-Unterturkheim, Germany
Filed June 28, 1968, Ser. No. 741,061
Claims priority, application Germany, July 1, 1967, D 53,498
Int. Cl. G05g 1/14
U.S. Cl. 74—560                                    31 Claims

ABSTRACT OF THE DISCLOSURE

A bearing support for the linkage lever, which is coupled with the adjusting member for the driving torque, at the foot or drive pedal of vehicles in which the foot plate has a substantially rigid housing for the form-locking support of a joint body, that is provided with a springy clamping part and with an aperture into which the bearing portion of the linkage lever is form-lockingly inserted; the bearing portion of the linkage lever, when inserted into the aperture of the joint body, engages the clamping part in such a manner that the latter is spring-deflected and therewith elastically stressed with respect to the joint body into a locking position in which the joint body rests against a housing wall of the foot plate under force-locking action.

BACKGROUND OF THE INVENTION

The present invention relates to a bearing support for the linkage lever, which is coupled to the adjusting member for the driving torque, at the foot or drive pedals of vehicles.

The aim underlying the present invention essentially resides in creating a simple and noise-free connection between the linkage lever and the drive pedal.

For this purpose, a bearing support is proposed according to the present invention in which the foot plate includes a rigid housing for the form-locking bearing support of a joint body. The joint body is provided with a clamping part and with an aperture, into which the bearing portion of the linkage lever is adapted to be inserted form-lockingly. The bearing portion inserted into the aperture of the jont body engages at the clamping part so that the latter is spring-deflected or elastically stressed with respect to the joint body into a locking position in which the joint body abuts force lockingly against the housing wall of the foot plate.

By the bearing support according to the present invention, it is achieved in a simple manner that the joint body is force-lockingly supported without play in its housing as also the bearing portion of the linkage is forcelockingly supported without play in the joint body and that rattle noises cannot occur.

According to a further feature of the present invention, the bearing support can be constructed in an advantageous manner such that the clamping part is adapted to spring-deflect with respect to the joint body into an assembly position and the joint body is adapted to be inserted into the housing of the foot plate exclusively with the clamping part in the assembly position. In this manner, a simple fastening of the linkage lever at the drive pedal is achieved.

The joint body and the clamping part may consist of one integral piece, preferably of synthetic plastic material. Also, the housing for the joint body and the foot plate may consist of one integral piece.

Accordingly, it is an object of the present invention to provide a bearing support for a linkage lever at the driving pedal of vehicles which avoids by simple means the aforementioned shortcomings and drawbacks encountered in the prior art.

Another object of the present invention resides in a bearing support for a linkage lever at the driving pedal of motor vehicles which assures a simple connection between the parts and avoids rattle noises or the like.

A further object of the present invention resides in a bearing support of the type described above in which a force-locking bearing support exists for both the joint body in its housing as also for the bearing part of the linkage in the joint body.

BRIEF DESCRIPTION OF THE DRAWING

These and other objects, features, and advantages of the present invention will come more obvious from the following description when taken in connection with the accompanying drawing which shows, for purposes of illustration only, one embodiment of a bearing support of the linkage lever at the drive pedal according to the present invention, and wherein.

DETAILED DESCRIPTION OF THE DRAWING

Figure 1:
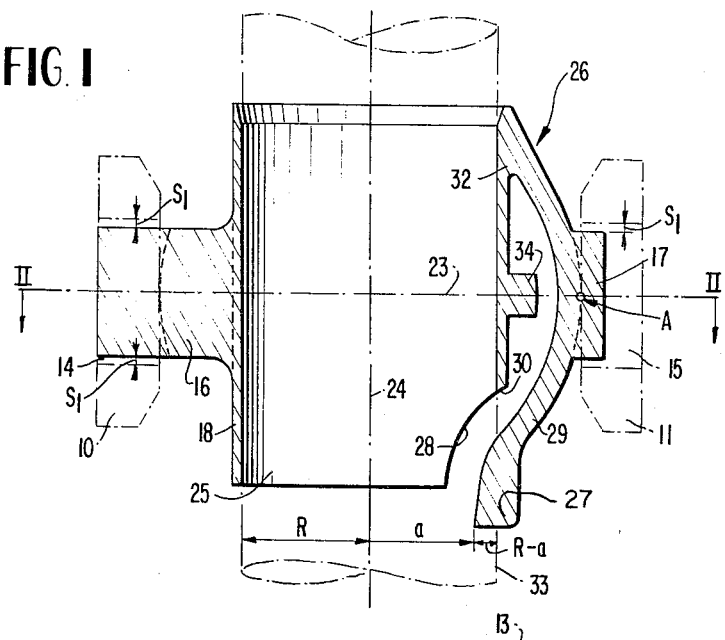
FIGURE 1 is a cross-sectional view through the bearing support parallel to the foot plate in accordance with the present invention.
Figure 2:
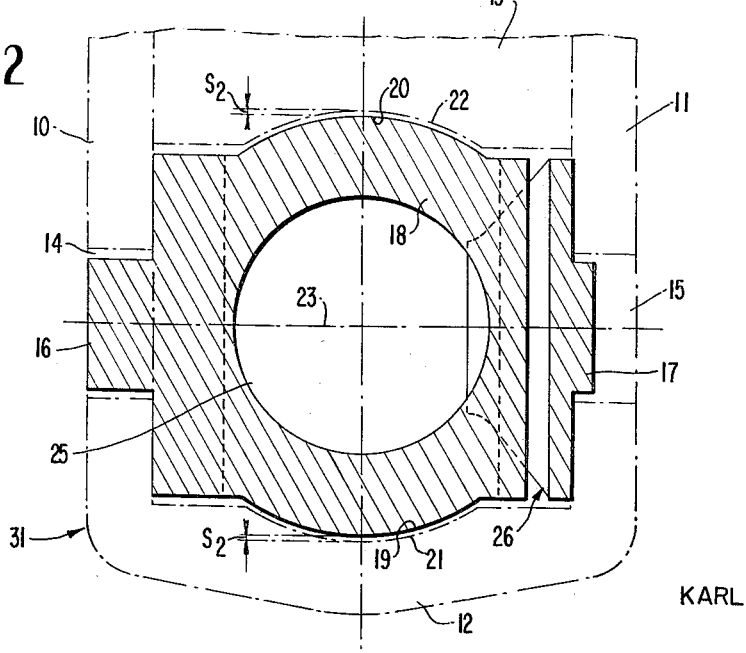
FIGURE 2 is a cross-sectional view through the bearing support perpendicular to the foot plate, taken along line II—II of FIGURE 1.

Referring now to the drawing wherein like reference numerals are used throughout the two views to designate like parts, the foot plate, not illustrated in further details, of the drive pedal is provided at its bottom side with two rigid, parallel housing support parts 10 and 11 which are connected with each other by an upper and by a lower cross bearer 12 and 13. The parts 10, 11, 12, and 13 are constructed of synthetic resinous material of any known type and are constructed in one piece with the foot plate.

Each housing support part 10 and 11 is provided with a bearing bore 14 and 15 which engages a bearing pin 16 and 17, respectively, of a joint body 18. The joint body 18 also consists of conventional synthetic resinous material and is provided with spherical bearing surfaces 19 and 20. The bearing surface 19 slides on a spherical bearing surface 21 of the lower cross bearer 12 whereas the bearing surface 20 cooperates with a corresponding bearing surface 22 at the upper cross bearer 13.

The common axis 23 of the coaxial bearing pins 16 and 17 is disposed perpendicular to the axis 24 of a bore 25 in the joint body 18. The bore 25 serves for the fastening of the joint body 18 with a pin portion of the linkage lever indicated schematically in dash and dot lines at 33.

The bearing pin 17 is arranged at a bow-shaped clamping part generally designated by reference numeral 26 and constructed in the manner of a leaf spring which is secured at the joint body 18 essentially parallel to the axis 24 of the bore 25 and as unilaterally clamped support. The free end 27 of the clamping part 26 has a distance $a$ from the axis 24 of the bore 25 which is smaller than the radius R of this bore.

The joint body 18 is provided with an aperture 28 between the axis 24 and the clamping part 26. The clamping part 26 is adapted to spring-deflect into an assembly position in which the end portion 27 is pivoted or deflected in the direction toward the axis 24 about the apex part 32 of the bow-shaped member 29 until the clamping part 26 comes into abutment at an abutment edge 30 of the aperture 28. In this assembly position of the clamping part 26 with respect to the joint body 18 the bearing pin 17 can be disengaged from the bearing bore 15 and the joint body 18 can be removed out of the housing generally designated by reference numeral 31 of the foot plate and constituted by the parts 10 to 13. The joint body 18 is inserted into the housing 31 in an analogous manner.

If the pin portion 33 of the linkage lever is inserted into the bore 25 of the joint body 18—as indicated in FIG. 1—, then the end portion 27 of the clamping part 26 is elastically deflected into a locking position through an arcuate distance corresponding to the distance R-a about the point of engagement A of the bow-shaped member 29 at the housing support part 11. In this locking position, the parts 18 and 33 as well as the parts 18 and 31 are clamped elastically against each other by the bow-shaped member 29 so that rattle noises cannot occur in the bearing support. The joint body 18 is locked within the housing 31 by this clamping action, and a disassembly is possible only when the end portion 27, after removal of the pin portion 33, snaps or spring-deflects back into its stress-free position, shown in FIGURE 1.

The play $S_1$ between the bearing pins 16 or 17 and the bearing bores 14 or 15 is constructed larger by a predetermined amount than the play $s_2$ between the corresponding spherical bearing surfaces 19 and 21 or 20 and 22 of the joint body 18 and the housing 31. As a result thereof, the adjusting forces are transmitted from the foot plate by way of the spherical bearing surfaces directly to the pin portion 33 in by-passing relationship to the bearing pins 16 and 17. Furthermore, a compensation for alignment errors between the drive pedal and the linkage lever is made possible thereby.

The danger exists due to adjusting forces introduced from the foot plate in the direction toward the axis 23 into the pin portion 33 that the bow-shaped member 29 of the clamping part 26 bends by a non-permissive amount in the direction of the axis 24. For purposes of eliminating this non-permissive bending action, an abutment cam 34 is provided at the joint body 18, against which the bow-shaped member 29 is adapted to be supported.

While I have shown and described only one embodiment in accordance with the present invention, it is understood that the same is not limited thereto but is susceptible of numerous changes and modifications as known to a person skilled in the art.

I claim:

1. A bearing support of a linkage lever, which is coupled to the adjusting member for the torque, at the drive pedal of vehicles, comprising foot plate means having rigid housing means for the bearing support of a joint body means, the joint body means including springy clamping means for force-locking support thereof in the rigid housing means as well as the form-locking of a bearing portion of the linkage lever in the joint body means and being provided with aperture means into which the bearing portion of the linkage lever is adapted to be inserted, and the bearing portion of the linkage lever inserted into the aperture means of the joint body means and engaging at the springy clamping means so that the springy clamping means is spring-deflected with respect to the joint body means into a locking position in which the joint body means abuts force-lockingly against a housing wall of the foot plate means and the bearing portion of the linkage lever is form-lockingly held on the joint body means.

2. A bearing support according to claim 1, wherein said clamping means is operable to spring-deflect into an assembly position with respect to the joint body means, said joint body means being insertable into the housing means of the foot plate means exclusively with the clamping means in the assembly position.

3. A bearing support according to claim 2, wherein the joint body means and the clamping means are constructed in one piece.

4. A bearing support according to claim 2, wherein the joint body means and the clamping means are made in one piece of synthetic resinous material.

5. A bearing support according to claim 3, wherein the housing means and the foot plate means are constructed in one piece.

6. A bearing support according to claim 4, wherein the housing means and the foot plate means are made in one piece from synthetic resinous material.

7. A bearing support according to claim 6, wherein said joint body means includes spherical bearing surfaces.

8. A bearing support according to claim 7, wherein the joint body means includes two coaxial bearing pins.

9. A bearing support according to claim 8, wherein the play between the bearing pins and the associated housing bores is larger than the play between the joint body means and the housing means of the foot plate means.

10. A bearing support according to claim 9, wherein one of the bearing pins is arranged at the clamping means.

11. A bearing support according to claim 10, wherein said joint body means is provided with a bore whose axis is arranged perpendicular to the common axis of the bearing pins.

12. A bearing support according to claim 11, wherein the clamping means is bow-shaped and constructed in the manner of a leaf spring and is arranged as unilaterally clamped support essentially parallel to the axis of the bore, the free end of the clamping means having a distance from this axis which is smaller than the radius of the bore.

13. A bearing support according to claim 12, wherein the joint body means is provided between the axis of its bore and the clamping means with an aperture.

14. A bearing support according to claim 13, further comprising abutment means for limiting the bending of the clamping means and arranged between the joint body means and the clamping means.

15. A bearing support according to claim 14, wherein the foot plate means includes two column-like parallel housing sections which are connected with each other by cross bearers having bearing surfaces.

16. A bearing support according to claim 1, wherein the joint body means and the clamping means are constructed in one piece.

17. A bearing support according to claim 1, wherein the joint body means and the clamping means are made in one piece of synthetic resinous material.

18. A bearing support according to claim 1, wherein the housing means and the foot plate means are constructed in one piece.

19. A bearing support according to claim 1, wherein the housing means and the foot plate means are made in one piece from synthetic resinous material.

20. A bearing support according to claim 1, wherein said joint body means includes spherical bearing surfaces.

21. A bearing support according to claim 1, wherein the joint body means includes two coaxial bearing pins.

22. A bearing support according to claim 21, wherein the play between the bearing pins and associated housing bores is larger than the play between the joint body means and the housing means of the foot plate means.

23. A bearing support according to claim 22, wherein one of the bearing pins is arranged at the clamping means.

24. A bearing support according to claim 23, wherein said joint body means is provided with a bore whose axis is arranged perpendicular to the common axis of the bearing pins.

25. A bearing support according to claim 21, wherein one of the bearing pins is arranged at the clamping means.

26. A bearing support according to claim 21, wherein said joint body means is provided with a bore whose axis is arranged perpendicular to the common axis of the bearing pins.

27. A bearing support according to claim 1, wherein the clamping means is bow-shaped and constructed in the manner of a leaf spring and is arranged as unilaterally clamped support essentially parallel to the axis of a bore for the bearing portion, the free end of the clamping means having a distance from this axis which is smaller than the radius of the bore.

28. A bearing support according to claim 27, wherein the joint body means is provided between the axis of its bore and the clamping means with an aperture.

29. A bearing support according to claim 28, further comprising abutment means for limiting the bending of the clamping means and arranged between the joint body means and the clamping means.

30. A bearing support according to claim 20, wherein the foot plate means includes two column-like parallel housing sections which are connected with each other by cross bearers having bearing surfaces.

31. A bearing support according to claim 1, further comprising abutment means for limiting the bending of the clamping means and arranged between the joint body means and the clamping means.

References Cited
UNITED STATES PATENTS

| | | | |
|---|---|---|---|
| 2,203,933 | 6/1940 | Thorp | 74—560 XR |
| 3,125,896 | 3/1964 | Beisel et al. | 74—513 XR |

MILTON KAUFMAN, Primary Examiner

F. D. SHOEMAKER, Assistant Examiner